United States Patent
Davis

(10) Patent No.: US 10,631,521 B2
(45) Date of Patent: Apr. 28, 2020

(54) CATTLE CURTAIN

(71) Applicant: Stephen Davis, Amagon, AR (US)

(72) Inventor: Stephen Davis, Amagon, AR (US)

(*) Notice: Subject to any disclaimer, the term of this patent is extended or adjusted under 35 U.S.C. 154(b) by 359 days.

(21) Appl. No.: 15/647,392

(22) Filed: Jul. 12, 2017

(65) Prior Publication Data

US 2019/0014743 A1    Jan. 17, 2019

(51) Int. Cl.
*A01K 13/00* (2006.01)

(52) U.S. Cl.
CPC ................... *A01K 13/003* (2013.01)

(58) Field of Classification Search
CPC ......... A01K 13/003; A01K 13/00; A61D 7/00
See application file for complete search history.

(56) References Cited

U.S. PATENT DOCUMENTS

| | | | | |
|---|---|---|---|---|
| 987,433 | A * | 3/1911 | Crawford | A01K 13/003 119/652 |
| 1,129,977 | A * | 3/1915 | Hagny | A01K 13/003 119/652 |
| 1,577,938 | A * | 3/1926 | Stanton | A01K 13/003 119/656 |
| 3,116,717 | A * | 1/1964 | Ragsdale | A01K 13/003 119/652 |
| 3,285,231 | A * | 11/1966 | Johnson | A01K 13/003 119/658 |
| 5,027,747 | A * | 7/1991 | Talley | A01K 13/003 119/652 |
| 5,456,212 | A * | 10/1995 | Gross | A01K 13/003 119/658 |
| 7,156,052 | B2 * | 1/2007 | Maupin | A01K 13/003 119/602 |
| 8,028,661 | B2 * | 10/2011 | Maupin | A01K 13/003 119/651 |
| 2009/0031965 | A1 * | 2/2009 | Campbell | A01K 13/003 119/652 |
| 2019/0104703 | A1 * | 4/2019 | Sandoval | A46B 11/0062 |

FOREIGN PATENT DOCUMENTS

EP        0254521 A1 *  1/1988  .......... A01K 13/003

* cited by examiner

*Primary Examiner* — Kristen C Hayes
(74) *Attorney, Agent, or Firm* — Daniel M. Cohn; Howard M. Cohn

(57) ABSTRACT

A cattle curtain utilizing a wicking action to displace concentrated insecticide to be wiped on animals as they pass through an animal pathway. The cattle curtain includes a reservoir body for holding the concentrated insecticide. A series of ropes is secured within the reservoir body, and the series of ropes is secured through fittings, whereby a metal pin is inserted through each rope. A valve disposed on top of the reservoir body to control flow of the concentrated insecticide into the series of ropes.

17 Claims, 3 Drawing Sheets

CATTLE CURTAIN

FIELD OF INVENTION

The present invention relates to a cattle curtain and in particular, to an apparatus for passively applying insecticide to livestock.

BACKGROUND OF THE INVENTION

Control and management of insects attracted to animals, such as dairy cows, has proven challenging, costly, illusive, and frequently ineffective. Both muscoid and nonmuscoid flies, in a wide variety of species, cluster synanthropically to humans and their domestic animals, or in close proximity to humans and domesticated animals, such as cows. Insects may have dramatic impact on the economics of animal production, which is a commercial industry constituting a significant contribution to the gross national product of the United States, where the dairy cattle industry has been estimated to produce $12 billion annually.

The several different species of flies commonly found on livestock premises may cause a number of problems, including irritating cows so severely that milk production suffers; transmitting disease pathogens; increasing enteric (intestinal) diseases among humans associated with cow herds; violation of regulatory rules and regulations, and a host of similar problems. The flies can cause severe irritation to the animal, pink eye blindness in one or both eyes and even the death of the animal. Further, as with another discomfort, the animal does not grow as rapidly or additionally, or in the case of milk cows, give as much milk Heretofore many attempts have been made to solve the insect problem in the cattle industry, but none has been found to be completely satisfactory. For instance, the insecticide dispenser may be satisfactory, but it may prove difficult to have cattle utilize the device.

SUMMARY OF THE INVENTION

According to an embodiment of the present invention, there is disclosed a cattle curtain utilizing a wicking action to displace concentrated insecticide to be wiped on animals as they pass through an animal pathway. The cattle curtain includes a reservoir body for holding the concentrated insecticide. A series of ropes is secured within the reservoir body, and the series of ropes is secured through fittings, whereby a metal pin is inserted through each rope. A valve disposed on top of the reservoir body to control flow of the concentrated insecticide into the series of ropes.

According to another embodiment of the present invention, there is disclosed a cattle curtain utilizing a wicking action to displace concentrated insecticide to be wiped on animals as they pass through an animal pathway. The cattle curtain includes a reservoir body for holding the concentrated insecticide. A series of ropes is secured within the reservoir body, and the series of ropes is secured through fittings, whereby a metal pin is inserted through each rope. One or more sensors gathers data, and computer receives the data gathered from the one or more sensors. A valve is disposed on top of the reservoir body to receive commands from the computer to control the flow of the concentrated insecticide into the series of ropes.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

Figure 1:
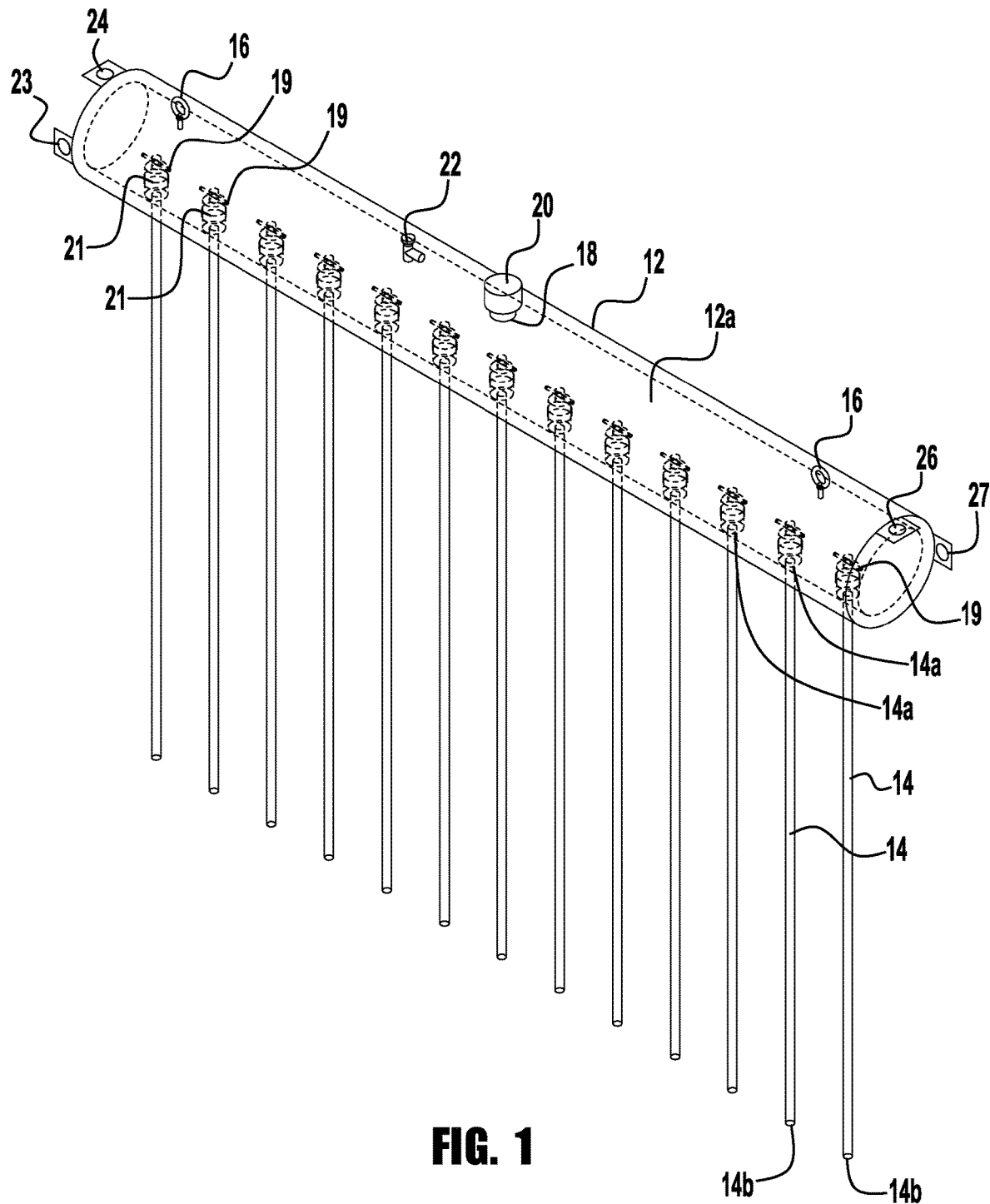

These and other objects of the present invention will become apparent, particularly when taken in light of the following illustrations wherein:

FIG. 1 is a front three-dimensional view of the cattle curtain, in accordance with the present invention.

Figure 2:
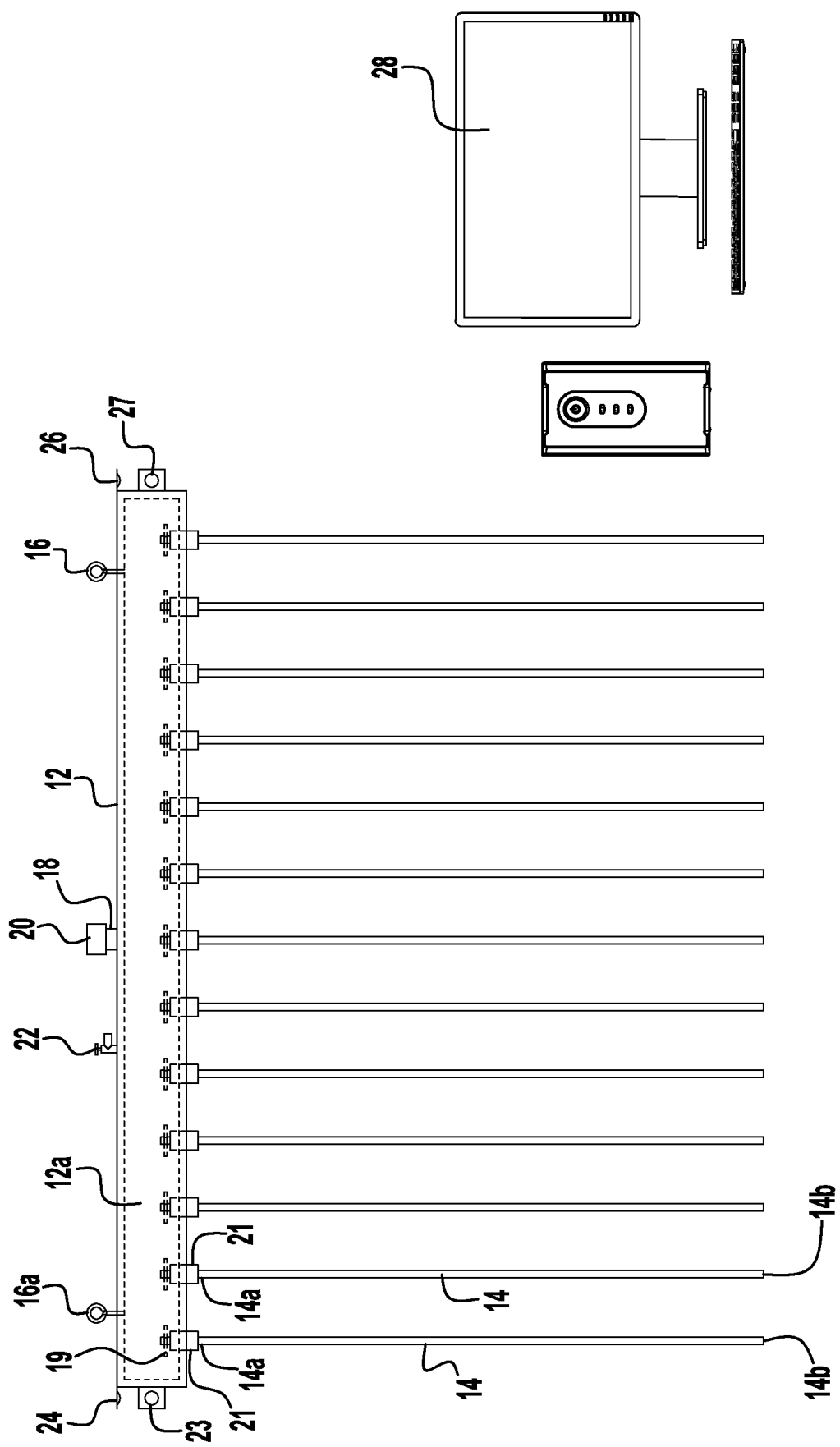

FIG. 2 is a front view of the cattle curtain, in accordance with the present invention.

Figure 3:
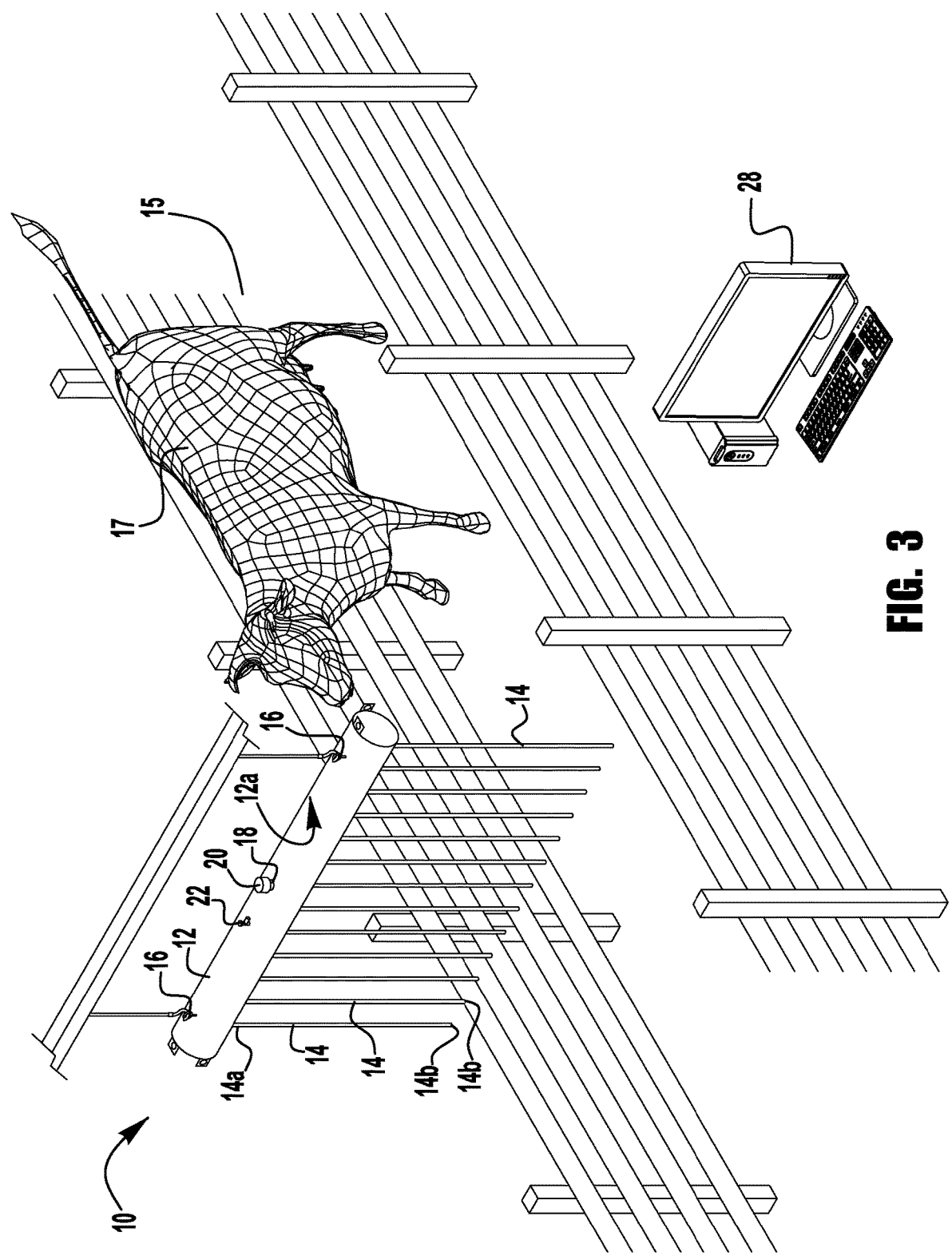

FIG. 3 is a front three-dimensional view of the cattle curtain in use, in accordance with the present invention.

DETAILED DESCRIPTION OF THE INVENTION

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Parasitic infestation by fleas, ticks and the like of domestic animals, such as dogs and cats, results in considerable nuisance, pain and possible harm to the infested animals as well as the animals' owners. Such infestation also results in the transmission of disease to and between humans and domestic animals. For this reason, effective control of such parasites has always been desirable and necessary. A variety of devices, apparatus and methods have been proposed for controlling insects, including flies, among cattle, including dairy cows. None has proven effective in achieving the level of control demanded by industry operators. None of the devices, apparatus and methods proposed for controlling flies in and around a dairy herd provides substantially complete control of a fly population using a substantially automated insect control apparatus requiring minimal operator involvement during operation of the apparatus.

The cattle curtain 10 is designed as an apparatus for passively applying insecticide to livestock, such as cow 17, including a reservoir body 12 for holding one or more ingredients. The cattle curtain 10 also includes a delivery system in fluid communication with the reservoir body 12 for discharging the one or more ingredients on the animal. The one or more ingredients dischargeable by the delivery system includes one or more chemicals.

In general terms, the cattle curtain 10 utilizes a wicking action to displace concentrated insecticide from a reservoir body 12 to a series of ropes 14. The cattle curtain 10 is generally positioned to hang in an animal pathway 15, such as gate or alley and the insecticide is wiped on the animals as they pass through the series of ropes 14, as illustrated in FIG. 2.

FIG. 1 illustrates a front view of the cattle curtain 10. The cattle curtain 10 comprises a reservoir body 12, typically a tubular pipe made from polyvinyl chloride (PVC), although any desired material may be used. The reservoir body 12 serves as a holding tank for insecticide diluted in a carrier liquid, contained within the interior 12a of the body. Typically, this carrier liquid is water or oil. The dimensions of the pipe 12 may vary, depending on the size of gate or alley where it is to be placed, as well as the amount of animals to be treated. The reservoir body 12 may have a length with a range between 48 inches and 96 inches, and a diameter with a range between 4 inches and 6 inches.

The reservoir body 12 contains eye bolts 16 or any other hanging means for mounting the reservoir body above an animal pathway 15. The reservoir body 12 contains an opening or port 18 for supplying the carrier liquid to the reservoir body 12. A threaded screw cap 20 is releasably secured to the port 18 which constitutes means for closing the port 18 to prevent liquid in the reservoir 12 from flowing out the port.

As seen in FIG. 2, the reservoir body 12 includes a plurality of openings 13, or a longitudinally extending slot through which the proximal ends 14a of the ropes 14 extend. The ropes 14 may be secured within the reservoir body 12 in any desired fashion. In the preferred embodiment, the ropes 14 are secured within the body 12 through the plurality of openings utilizing vinyl fittings and compression nuts 21. Further, above each of the vinyl fittings and compression nuts 21 is a metal pin 19. The metal pin 19 is inserted through the rope 14 directly above the vinyl fittings and compression nuts 21 to prevent the rope from being pulled out of the fitting when the cattle curtain 10 is in use.

The carrier liquid containing the insecticide flows through the plurality of openings (not shown), or through the longitudinally extending slot and wicks to the proximal ends 14a of the ropes 14. As it does so, a vacuum is pulled in the reservoir body 12. A valve 22 is disposed on the top of the reservoir body 12 to control the flow of liquid into the ropes 14. In a first embodiment, the valve 22 is a bleed valve 22 disposed on the top of the reservoir body 12 used to regulate the amount of air allowed into the body, thus controlling the flow of liquid into the ropes 14. In a second embodiment, as described below, the valve 22 is controlled by a computer 28 to regulate the flow of liquid to the ropes 14.

The ropes 14 have proximal ends 14a communicating with the interior 12a of the reservoir body 12, and distal ends 14b adapted for extending into the animal pathway 15. The liquid in the reservoir body 12 communicates with and moistens the ropes 14 so that when an animal passing through the pathway 15 contacts the moistened ropes 14, the liquid is applied to the animal.

Also included in the present invention, as illustrated in FIG. 2 and FIG. 3, is the possibility of one or more sensors 23, including motion sensors 24, moisture sensors 26, and timing sensors 27. The one or more sensors, including the motion sensors 24, moisture sensors 26, and timing sensors 27 are connected to a computer 28. These sensors 23 gather relevant data, and transmit this data to the computer 28. In turn, the computer receives the data garnered by the sensors 23, and based on settings determined buy the user, commands the valve 22 to either open or close to control the flow of the concentrated insecticide into the series of ropes 14.

The motion sensors 24 are strategically placed either on the cattle curtain 10 or within the gate or alley 15. When the motion sensors detect the presence of cattle, a signal is sent to the computer 28. In turn, the computer 28 would control the valve 22 within the cattle curtain 10 to release the chemicals to the ropes 14.

The moisture sensors 26 may be utilized for determining the moisture levels of the ropes 14. The moisture sensors 26 are disposed on the ropes 14 and measure the level of chemical agent disposed thereon. The moisture sensors 26 send this information to the computer 28. If the level of moisture doesn't reach the threshold as determined by the user, the computer 28 will send a signal to the valve 22 within the reservoir body 12 to release chemicals to the ropes 14.

The timing sensors 27 can be used to scheduling discharge of the one or more ingredients. At certain predetermined time intervals, the timing sensor 27 can transmit a signal is sent to the computer 28. In turn, the computer 28 would control the valve 22 within the cattle curtain 10 to release the chemicals to the ropes 14.

As provided by the present invention, the cattle curtain 10 may include a pump 30. The pump of the present invention may be an air operated pump to contribute to holding the one or more ingredients in the reservoir body 12 at a substantially constant pressure before and during discharge of the one or more ingredients. The cattle curtain 10 may also include one or more sources of electrical power for energizing operation of the apparatus.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A cattle curtain utilizing a wicking action to displace concentrated insecticide to be wiped on animals as they pass through an animal pathway, comprising:
    a reservoir body for holding the concentrated insecticide;
    a series of ropes secured within the reservoir body;
    the series of ropes secured through fittings, whereby a metal pin is inserted through each rope; and
    a valve disposed on top of the reservoir body to control flow of the concentrated insecticide into the series of ropes;

wherein the reservoir body contains eye bolts for mounting the reservoir body above the animal pathway;

wherein the reservoir body is formed of a tubular pipe made from polyvinyl chloride (PVC); and wherein the reservoir body contains an opening for supplying the concentrated insecticide to the reservoir body, and a threaded screw cap releasably secured to the opening.

2. The cattle curtain of claim 1 wherein the series of ropes have proximal ends communicating with an interior of the reservoir body, and distal ends adapted for extending into the animal pathway.

3. The cattle curtain of claim 1 wherein the reservoir body includes a plurality of openings through which proximal ends of the series of ropes extend.

4. The cattle curtain of claim 3 further including the series of ropes secured within the reservoir body utilizing vinyl fittings and compression nuts.

5. The cattle curtain of claim 4 wherein the valve disposed on the top of the reservoir body to regulate the amount of air allowed into the reservoir body is a bleed valve, to control the flow of the concentrated insecticide into the series of ropes.

6. A cattle curtain utilizing a wicking action to displace concentrated insecticide to be wiped on animals as they pass through an animal pathway, comprising:
- a reservoir body for holding the concentrated insecticide;
- a series of ropes secured within the reservoir body;
- the series of ropes secured through fittings, whereby a metal pin is inserted through each rope;
- one or more sensors to gather data;
- a computer that receives the data gathered from the one or more sensors;
- a valve disposed on top of the reservoir body to receive commands from the computer to control the flow of the concentrated insecticide into the series of ropes.

7. The cattle curtain of claim 6 wherein the reservoir body contains eye bolts for mounting the reservoir body above an animal pathway.

8. The cattle curtain of claim 7 wherein the reservoir body is formed of a tubular pipe made from polyvinyl chloride (PVC).

9. The cattle u of claim 8 wherein the reservoir body contains an opening for supplying the concentrated insecticide to the reservoir body, and a threaded screw cap releasably secured to the opening.

10. The cattle curtain of claim 9 when the reservoir body includes a plurality of openings through which proximal ends of the series of ropes extend.

11. The cattle curtain of claim 10 further including the series of ropes secured within the reservoir body utilizing vinyl fittings and compression nuts.

12. The cattle curtain of claim 11 wherein the series of ropes have proximal ends communicating with an interior of the reservoir body, and distal ends adapted for extending into the animal pathway.

13. The cattle curtain of claim 12 wherein the reservoir body includes a plurality of openings through which proximal ends of the series of ropes extend.

14. The cattle curtain of claim 13 further including the series of ropes secured within the reservoir body utilizing vinyl fittings and compression nuts.

15. The cattle curtain of claim 6 wherein the one or more sensors include motion sensors to detect the presence of cattle and transmit a signal to the computer to control the flow of the concentrated insecticide into the series of ropes.

16. The cattle curtain of claim 6 wherein the one or more sensors include moisture sensors to determine moisture levels of the series of ropes and transmit a signal to the computer to control the flow of the concentrated insecticide into the series of ropes.

17. The cattle curtain of claim 6 wherein the one or more sensors include timing sensors to transmit a signal to the computer to control the flow of the concentrated insecticide into the series of ropes.

* * * * *